(12) United States Patent
Nakano et al.

(10) Patent No.: US 8,330,838 B2
(45) Date of Patent: Dec. 11, 2012

(54) SHADING CORRECTING DEVICE AND IMAGING APPARATUS

(75) Inventors: Teppei Nakano, Kanagawa (JP); Keizo Tashiro, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 560 days.

(21) Appl. No.: 12/556,741

(22) Filed: Sep. 10, 2009

(65) Prior Publication Data

US 2010/0097504 A1   Apr. 22, 2010

(30) Foreign Application Priority Data

Oct. 21, 2008   (JP) .................. 2008-271297

(51) Int. Cl.
*H04N 9/64*   (2006.01)
(52) U.S. Cl. .................. 348/251; 348/222.1; 382/167
(58) Field of Classification Search .................. 348/251; 382/167
See application file for complete search history.

(56) References Cited

U.S. PATENT DOCUMENTS

| | | | |
|---|---|---|---|
| 2001/0005429 A1* | 6/2001 | Ishiga et al. | 382/167 |
| 2008/0159762 A1* | 7/2008 | Nakane | 399/49 |
| 2008/0161690 A1* | 7/2008 | Sato et al. | 600/443 |
| 2009/0147110 A1* | 6/2009 | Muramatsu et al. | 348/255 |

FOREIGN PATENT DOCUMENTS

| | | |
|---|---|---|
| JP | 8-79773 | 3/1996 |
| JP | 2006-74357 A | 3/2006 |
| JP | 2006-121612 A | 5/2006 |
| JP | 2006-246196 | 9/2006 |
| JP | 2007-520179 A | 7/2007 |
| WO | WO2006054607 A1 * | 5/2006 |

OTHER PUBLICATIONS

Japanese Office Action Issued May 15, 2012 in Patent Application No. 2008-271297 (with English translation).

* cited by examiner

*Primary Examiner* — Jason Chan
*Assistant Examiner* — Cynthia Segura
(74) *Attorney, Agent, or Firm* — Oblon, Spivak, McClelland, Maier & Neustadt, L.L.P.

(57) ABSTRACT

A shading correcting device includes a correction-coefficient interpolation unit that calculates a color shading correction coefficient used at a position of a pixel at which the color shading correction coefficient is not set among pixels in an image signal by an interpolation process using a color shading correction coefficient set at a predetermined position. A color shading correction coefficient sent to the correction-coefficient interpolation unit is a color shading correction coefficient that is for a first color and corresponds to a pixel value of a second color adjacent to a pixel of the first color.

18 Claims, 6 Drawing Sheets

SHADING CORRECTING DEVICE AND IMAGING APPARATUS

CROSS-REFERENCE TO RELATED APPLICATIONS

This application is based upon and claims the benefit of priority from the prior Japanese Patent Application No. 2008-271297, filed on Oct. 21, 2008; the entire contents of which are incorporated herein by reference.

BACKGROUND OF THE INVENTION

1. Field of the Invention

The present invention relates to a shading correcting device that performs shading correction on an image signal and an imaging apparatus.

2. Description of the Related Art

In recent years, there is an increasing demand for a compact and low height image sensor as a solid-state image sensor, such as a charge coupled device (CCD) and a complementary metal oxide semiconductor (CMOS), mounted on a digital still camera, a mobile phone, or the like, along with the miniaturization of electronic devices. However, because a distance between an optical system and an image sensor becomes narrow due to the low height, an incident angle of light entering the image sensor becomes small in a peripheral part of the image sensor compared with the center of the image sensor. Light has a property that a refractive index when passing a lens, an infrared light cut filter, or the like increases in proportion to the wavelength of the light. Therefore, if the incident angle of light entering the image sensor is small, the position at which the light is focused changes depending on the wavelength of the light. Consequently, color shading occurs on an output image from the image sensor, so that coloring is recognized on the peripheral part of the image sensor.

Japanese Patent Application Laid-open No. H08-79773 discloses a shading correcting device, in which color shading is corrected by approximating a correction coefficient corresponding to coordinates (x,y) of an image sensor by the following N-dimensional surface function (N is an integer equal to or larger than two) for each color:

N-dimensional surface function: $f(x, y) = a_{01}x + a_{02}x \cdot y^2 + a_{10}xx + a_{11}xy + a_{12}xy^2 + a_{20}xx^2 + a_{21}xx^2y + a_{22}x \cdot x^2y^2 + \ldots + a_{N-1 N-1}xx^{N-1}y^{N-1}$ Japanese Patent Application Laid-open No. 2006-246196 discloses a shading correcting device, in which block correction values of part of blocks out of block correction values for correcting an image in correcting process unit (block) is stored and block correction values of other blocks are calculated based on the stored block correction values. Then, luminance values of pixels composing an image are corrected based on the stored block correction values and the calculated block correction values.

However, because of downsizing of a pixel size, there appears a problem that color shading occurs due to a layout of pixels. The technology disclosed in Japanese Patent Application Laid-open No. H08-79773 can only perform the correction expressed by the N-dimensional surface function, so that coloring shading due to the layout of pixels cannot be corrected accurately.

The technology disclosed in Japanese Patent Application Laid-open No. 2006-246196 only corrects the luminance values of pixels, so that color shading cannot be corrected efficiently. Furthermore, if the color shading correction is performed, correction values of four colors of, for example, red, green, blue, and green need to be stored, which leads to increase in size of a circuit configuration.

BRIEF SUMMARY OF THE INVENTION

A shading correcting device according to an embodiment of the present invention comprises: a correction-coefficient output unit that outputs a correction coefficient for performing a color shading correction on an image signal, which is set on a predetermined position on an image area displayed on a screen and corresponds to each position, as a color shading correction coefficient for each position; and a correction-coefficient interpolation unit that calculates a color shading correction coefficient used for the color shading correction at a position of a pixel at which the color shading correction coefficient is not set among pixels in the image signal by an interpolation process using the color shading correction coefficient from the correction-coefficient output unit, wherein the color shading correction coefficient output from the correction-coefficient output unit is a color shading correction coefficient that is for a first color as a target for the color shading correction and corresponds to a pixel value of a second color adjacent to a pixel of the first color.

An imaging apparatus according to an embodiment of the present invention comprises: an image-signal generating unit that generates an image signal by focusing light from an imaging target; a color-shading correcting unit that performs a color shading correction on the image signal; and a luminance-shading correcting unit that performs a luminance shading correction on the image signal that is subjected to the color shading correction, wherein the color-shading correcting unit includes a correction-coefficient output unit that outputs a correction coefficient for performing a color shading correction on the image signal, which is set on a predetermined position on an image area displayed on a screen and corresponds to each position, as a color shading correction coefficient for each position; and a correction-coefficient interpolation unit that calculates a color shading correction coefficient used for the color shading correction at a position of a pixel at which the color shading correction coefficient is not set among pixels in the image signal by an interpolation process using the color shading correction coefficient from the correction-coefficient output unit, the color shading correction coefficient output from the correction-coefficient output unit is a color shading correction coefficient that is for a first color as a target for the color shading correction and corresponds to a pixel value of a second color adjacent to a pixel of the first color.

DETAILED DESCRIPTION OF THE INVENTION

Exemplary embodiments of a shading correcting device and an imaging apparatus according to the present invention will be explained below in detail with reference to the accompanying drawings. The present invention is not limited to the following embodiments.

Figure 1:
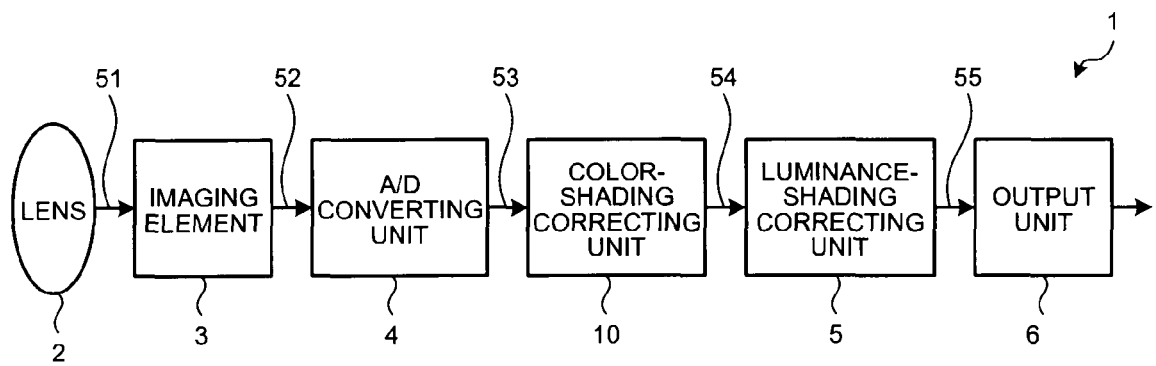
FIG. 1 is a block diagram of a configuration of an imaging apparatus including a shading correcting device according to a first embodiment of the present invention.

FIG. 1 is a block diagram of a configuration of an imaging apparatus 1 including a shading correcting device according to a first embodiment of the present invention. The imaging apparatus 1 is an apparatus that captures an image, performs a color shading correction and a luminance shading correction on an image signal, and outputs the image signal. The imaging apparatus 1 includes a lens 2, an imaging element 3, an analog/digital (A/D) converting unit 4, a color-shading correcting unit 10, a luminance-shading correcting unit 5, and an output unit 6.

The imaging element 3, the A/D converting unit 4, the color-shading correcting unit 10, the luminance-shading correcting unit 5, and the output unit 6 constitute an image sensor. The imaging apparatus 1 includes the color-shading correcting unit 10 as an image processing unit of the image sensor.

The color-shading correcting unit 10 arranges correction values (hereinafter, color-shading correction coefficients) for reducing color shading at predetermined intervals on a screen, and generates a color-shading correction coefficient for an area in which a color-shading correction coefficient is not present by performing a linear interpolation process using color-shading correction coefficients around the area. Moreover, the color-shading correcting unit 10 performs the color shading correction on red and blue pixels so that a ratio of a coloration state between red and green and between blue and green becomes close to 1:1. Therefore, the color-shading correcting unit 10 performs the color shading correction on red with respect to green and on blue with respect to green.

The lens 2 focuses light entered the imaging apparatus 1 from outside and sends the light to the imaging element 3 as a focused light 51. The imaging element 3 converts the focused light 51 from the lens 2 to an analog signal 52 and sends it to the A/D converting unit 4. The A/D converting unit 4 converts the analog signal 52 from the imaging element 3 to a digital image signal 53 and sends it to the color-shading correcting unit 10.

The color-shading correcting unit 10 performs the color shading correction on the image signal 53 from the A/D converting unit 4 and sends the signal subjected to the color shading correction to the luminance-shading correcting unit 5 as a color-shading-corrected image signal 54.

The luminance-shading correcting unit 5 performs the luminance shading correction on the color-shading-corrected image signal 54 from the color-shading correcting unit 10 and sends the signal subjected to the luminance shading correction to the output unit 6 as a luminance-shading-corrected image signal 55. The output unit 6 outputs the image signal subjected to the color shading correction and the luminance shading correction.

Figure 2:
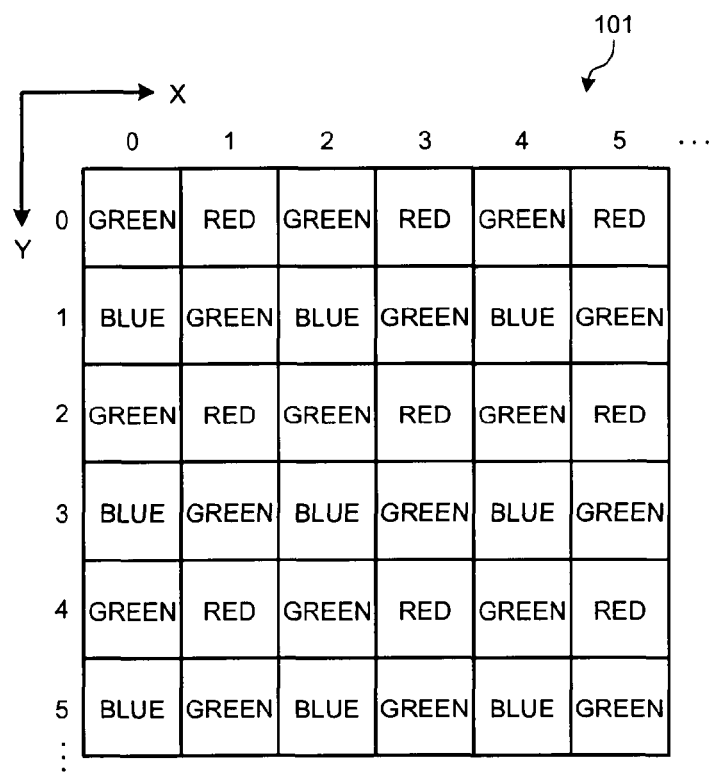
FIG. 2 is a schematic diagram of a bayer array.

Next, an operation procedure of the imaging apparatus 1 is explained. Light that enters the imaging apparatus 1 from outside is focused by the lens 2 to be sent to the imaging element 3. The imaging element 3 is an imaging element of m×n pixels (m and n are natural numbers) having a color filter array of a bayer array. The imaging element 3 photoelectrically converts an optical image of the focused light 51 to generate the analog signal 52 for each pixel. FIG. 2 is a schematic diagram of a bayer array 101. As shown in FIG. 2, in the bayer array 101, color filters are arranged in an X-axis direction (lateral direction) in the order of green, red, green, red, . . . on even-number stages in an Y-axis (longitudinal direction), and color filters are arranged in the X-axis direction in the order of blue, green, blue, green, . . . on odd-number stages in the Y-axis.

The analog signal 52 generated in the imaging element 3 is converted to the digital image signal 53 in the A/D converting unit 4. Then, the image signal 53 is subjected to the color shading correction in the color-shading correcting unit 10, and is further subjected to the luminance shading correction in the luminance-shading correcting unit 5. The image signal subjected to the color shading correction and the luminance shading correction is output from the output unit 6.

The image signal 53 input to the color-shading correcting unit 10 includes color shading. Color shading is a state in which color becomes uneven when an object having a uniform luminance is captured. To reduce such uneven coloration, the image signal 53 needs to be multiplied by the color shading correction coefficient capable of cancelling the uneven coloration. The color-shading correcting unit 10 multiples red and blue by the color shading correction coefficient at each coordinate of the image signal 53 with pixel values of adjacent green pixels as a reference. At this time, the color-shading correcting unit 10 performs the color shading correction on a red pixel and a blue pixel so that a ratio of a coloration state between red and green and between blue and green becomes close to 1:1. Whereby, the color-shading correcting unit 10 reduces color shading of the image signal 53.

Figure 3:
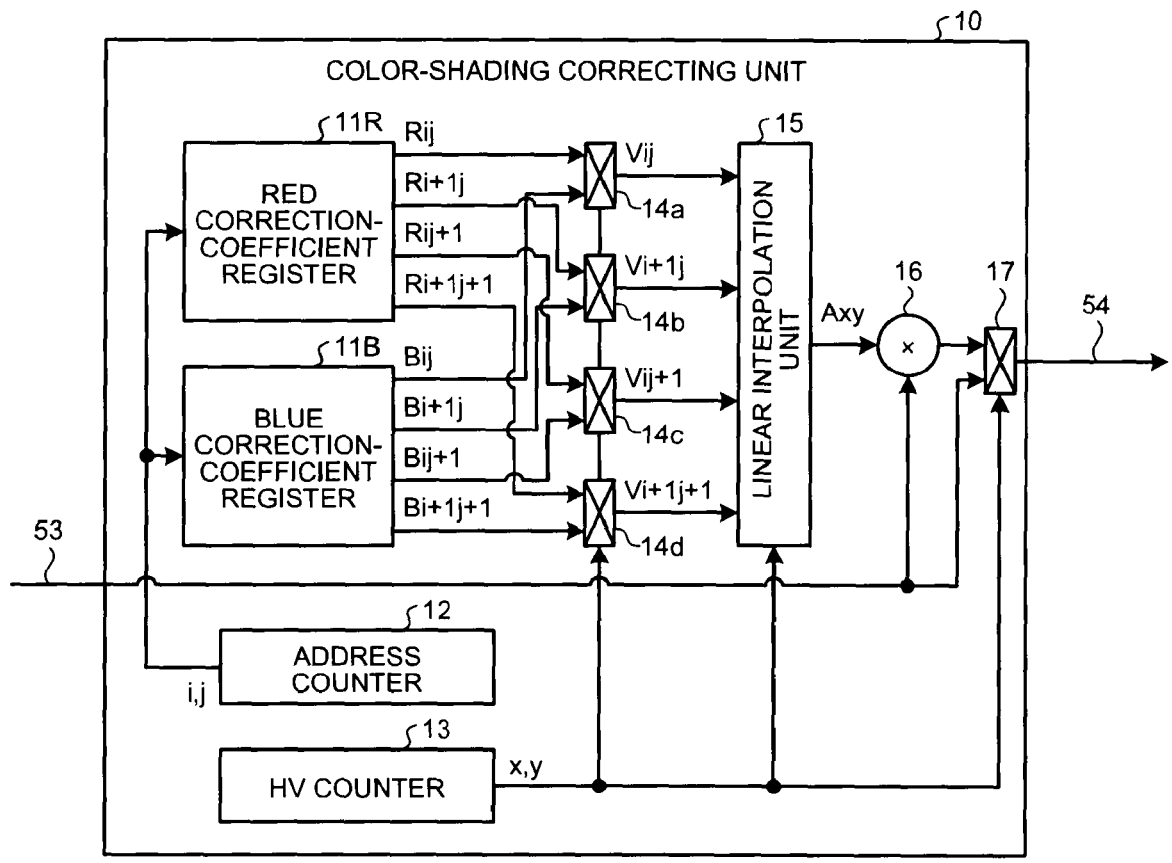
FIG. 3 is a block diagram of a configuration of a color-shading correcting unit as shown in FIG. 1.

A detailed configuration of the color-shading correcting unit 10 is explained below. FIG. 3 is a block diagram of the configuration of the color-shading correcting unit 10. The color-shading correcting unit 10 includes a red correction-coefficient register 11R, a blue correction-coefficient register 11B, an address counter 12, an HV counter 13, selectors 14a, 14b, 14c, 14d, and 17, a linear interpolation unit 15, and a multiplier (accumulator) 16.

The address counter 12 generates positions (grid positions) of pixels as targets for the shading correction in order in accordance with an instruction from a timing control circuit (not shown). In the present embodiment, the color shading correction coefficients for reducing color shading are arranged at predetermined intervals on a screen (pixel area). Each grid formed by the arrangement interval of the color shading correction coefficients becomes a unit of the color shading correcting process (interpolation process). Therefore, the color-shading correcting unit 10 calculates (interpolates) the color shading correction coefficient in a grid by using four color shading correction coefficients set on the four grid points constituting each grid.

Figure 4:
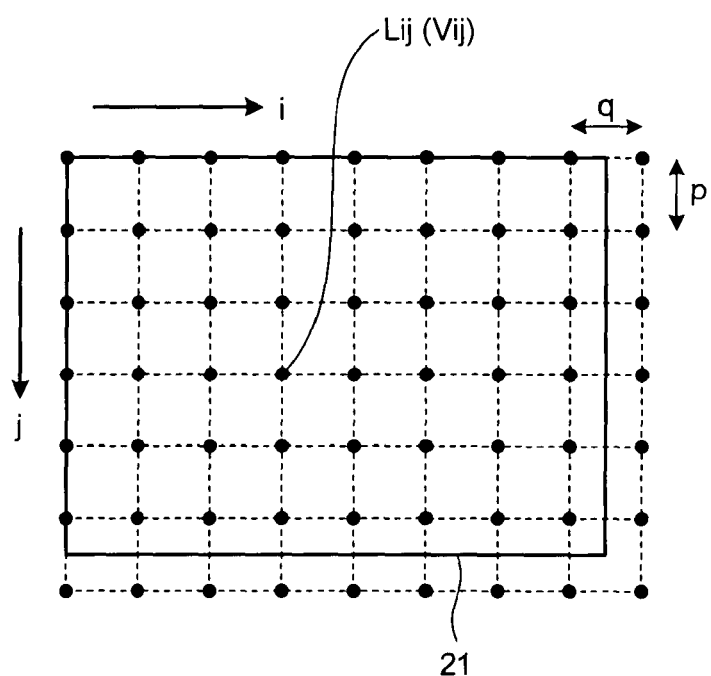
FIG. 4 is a schematic diagram for explaining a pixel area and an arrangement interval of color shading coefficients.

FIG. 4 is a schematic diagram for explaining a pixel area 21 and the arrangement interval of the color shading correction coefficients. In the pixel area 21, color shading correction coefficients Vij are arranged at intervals of q pixels ("q" is a natural number) in an i direction corresponding to the X-axis direction and at intervals of p pixels ("p" is a natural number) in a j direction corresponding to the Y-axis direction. In FIG. 4, grid points constituting each grid are each denoted as a grid point Lij, and the color shading correction coefficient is set on the grid point Lij. A grid formed by the positions at which the color shading correction coefficients are arranged has q pixels in the i direction and p pixels in the j direction. Because the image signal 53 is in the bayer array, the number of "p" and "q" is selected to be a multiple of two.

The number of "q" in the i direction and "p" in the j direction is, for example, 128 pixels. For example, the color shading correction coefficients are arranged in the whole pixel area 21 by arranging the color shading correction coefficients at intervals of 128 pixels. At this time, if the size of the pixel area 21 is not a multiple of 128 pixels in the i direction or the j direction, the color shading correction coefficient is arranged also in an area outside (right end or lower end) the pixel area 21.

The address counter 12 is a counter for selecting a grid point. Specifically, the address counter 12 generates "i" and "j" indicating positions of the grid points Lij as positions of the color shading correction coefficients in order and sends them to the red correction-coefficient register 11R and the blue correction-coefficient register 11B.

The HV counter 13 is a counter for determining coordinates of a pixel. Specifically, the HV counter 13 generates coordinates of pixels as targets for the shading correction in order in accordance with an instruction from a timing control circuit (not shown). The HV counter 13 generates coordinates (x,y) in order with the grid point Lij selected by the address counter 12 as an origin. In other words, the HV counter 13 generates the coordinates (x,y) in order in a grid in which the grid point Lij is an upper-left grid point. The HV counter 13 sends the generated coordinates (x,y) to the selectors 14a to 14d, the linear interpolation unit 15, and the selector 17.

The red correction-coefficient register 11R is a register that stores therein the color shading correction coefficients used for red pixels. The red correction-coefficient register 11R inputs "i" and "j" of the grid point Lij sent from the address counter 12, and outputs the color shading correction coefficient corresponding to "i" and "j". Specifically, the red correction-coefficient register 11R outputs Rij, Ri+1j, Rij+1, and Ri+1j+1 as the color shading correction coefficients corresponding to "i" and "j". Rij, Ri+1j, Rij+1, and Ri+1j+1 are the color shading correction coefficients set on the grid points Lij, Li+1j, Lij+1, and Li+1j+1, respectively. Rij, Ri+1j, Rij+1, and Ri+1j+1 from the red correction-coefficient register 11R are sent to the selectors 14a to 14d, respectively.

The blue correction-coefficient register 11B is a register that stores therein the color shading correction coefficients used for blue pixels. The blue correction-coefficient register 11B inputs "i" and "j" of the grid point Lij sent from the address counter 12, and outputs the color shading correction coefficient corresponding to "i" and "j". Specifically, the blue correction-coefficient register 11B outputs Bij, Bi+1j, Bij+1, and Bi+1j+1 as the color shading correction coefficients corresponding to "i" and "j". Bij, Bi+1j, Bij+1, and Bi+1j+1 are the color shading correction coefficients set on the grid points Lij, Li+1j, Lij+1, and Li+1j+1, respectively. Bij, Bi+1j, Bij+1, and Bi+1j+1 from the blue correction-coefficient register 11B are sent to the selectors 14a to 14d, respectively.

In the present embodiment, grids are allocated to the pixel area (image area) 21 as shown in FIG. 4, in which grid points are arranged at p pixel intervals in a vertical direction and at q pixel intervals in a horizontal direction. The red correction-coefficient register 11R and the blue correction-coefficient register 11B store therein the color shading correction coefficient allocated to each grid point of a grid.

The selector 14a inputs Rij from the red correction-coefficient register 11R and Bij from the blue correction-coefficient register 11B, and further inputs coordinates (x,y) from the HV counter 13. When "y" is an even number, the selector 14a selects Rij as the color shading correction coefficient Vij and sends it to the linear interpolation unit 15. When "y" is an odd number, the selector 14a selects Bij as the color shading correction coefficient Vij and sends it to the linear interpolation unit 15.

In the similar manner, the selectors 14b, 14c, and 14d input Ri+1j, Rij+1, and Ri+1j+1 from the red correction-coefficient register 11R and Bi+1j, Bij+1, and Bi+1j+1 from the blue correction-coefficient register 11B, respectively, and further input the coordinates (x,y) from the HV counter 13. When "y" is an even number, the selectors 14b, 14c, and 14d select Ri+1j, Rij+1, and Ri+1j+1 as the color shading correction coefficients Vi+1j, Vij+1, and Vi+1j+1, respectively, and send them to the linear interpolation unit 15. When "y" is an odd number, the selectors 14b, 14c, and 14d select Bi+1j, Bij+1, and Bi+1j+1 as the color shading correction coefficients Vi+1j, Vij+1, and Vi+1j+1, respectively, and send them to the linear interpolation unit 15.

The linear interpolation unit 15 inputs the color shading correction coefficients sent from the selectors 14a to 14d, and further inputs the coordinates (x,y) sent from the HV counter 13. The linear interpolation unit 15 generates the color shading correction coefficient corresponding to the coordinates (x,y) by using the color shading correction coefficients sent from the selectors 14a to 14d. If the coordinates (x,y) sent from the HV counter 13 are coordinates at grid points, the linear interpolation unit 15 sets the color shading correction coefficients sent from the selectors 14a to 14d without change. For example, if the coordinates (x,y) sent from the HV counter 13 are an origin, the linear interpolation unit 15 sets the color shading correction coefficient sent from the selector 14a to the color shading correction coefficient.

On the other hands, if the coordinates (x,y) sent from the HV counter 13 are not coordinates at a grid point, the linear interpolation unit 15 generates the color shading correction coefficient by using the color shading correction coefficients sent from the selectors 14a to 14d. In other words, the linear interpolation unit 15 generates the color shading correction coefficient to a pixel in an area in which the color shading correction coefficient is not set by using the color shading correction coefficients Vij, Vi+1j, Vij+1, and Vi+1j+1 that are given to the grid points (four grid points constituting a grid in which the pixel is included) closest to the pixel. At this time, the linear interpolation unit 15 generates the color shading correction coefficient by using the linear interpolation.

Figure 5:
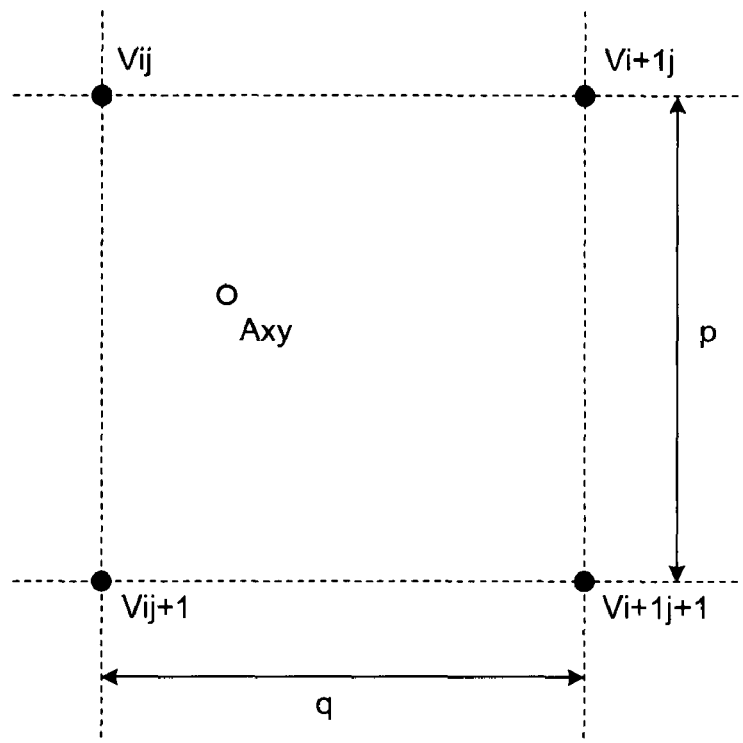
FIG. 5 is a schematic diagram for explaining grid points used in a linear interpolation.

FIG. 5 is a schematic diagram for explaining grid points used in the linear interpolation. When the coordinates (x,y) is present in an area surrounded by the grid points Lij, Li+1j, Lij+1, and Li+1j+1, the linear interpolation unit 15 generates a color shading correction coefficient Axy at the coordinates (x,y) by using the color shading correction coefficients that are set on the grid points Lij, Li+1j, Lij+1, and Li+1j+1. Specifically, the linear interpolation unit 15 generates the color shading correction coefficient Axy by using the color shading correction coefficients Vij, Vi+1j, Vij+1, and Vi+1j+1 that are set on the grid points Lij, Li+1j, Lij+1, and Li+1j+1. For example, the linear interpolation unit 15 generates the color shading correction coefficient Axy at the coordinates (x,y) with the grid point Lij as an origin by Equation (1).

$$Axy = \frac{1}{pq}\left\{\begin{array}{l}(Vi+1j+1-Vi+1j-Vij+1+Vij)xy+\\(Vij+1-Vij)qy+(Vi+1j-Vij)px\end{array}\right\}+Vij \quad (1)$$

The multiplier 16 is, for example, a circuit that multiplies the image signal 53 by the color shading correction coefficient Axy generated by the linear interpolation unit 15. The multiplier 16 sends the multiplication result to the selector 17.

The selector 17 inputs the multiplication result sent from the multiplier 16, the image signal 53, and the coordinates (x,y) from the HV counter 13. The selector 17 selects any of the multiplication result sent from the multiplier 16 and the image signal 53 based on the coordinates (x,y) and outputs it as the color-shading-corrected image signal 54. When the coordinates (x,y) indicate a position of a green pixel, the selector 17 selects and outputs the image signal 53. When the coordinates (x,y) indicate a position of a blue pixel or a red pixel, the selector 17 selects and outputs the multiplication result sent from the multiplier 16.

Next, an operation procedure of the color-shading-correcting unit 10 is explained. When the image signal 53 is input to the color-shading correcting unit 10, the address counter 12 generates a position ("i" and "j") of a grid corresponding to a position of a pixel of the image signal 53. "i" and "j" are numbers of the upper left grid point Lij of the grid in which the pixel is included. The address counter 12 sends generated "i" and "j" to the red correction-coefficient register 11R and the blue correction-coefficient register 11B.

The HV counter 13 generates the coordinates (x,y) at the pixel of the image signal 53. The coordinates (x,y) are coordinates with the grid point Lij selected by the address counter 12 as an origin. The HV counter 13 sends generated coordinates (x,y) to the selectors 14a to 14d, the linear interpolation unit 15, and the selector 17.

The address counter 12 and the HV counter 13 generate the grid positions ("i" and "j") of pixels and the coordinates (x,y) of the pixels on each stage of the image signal 53 from left to right. When the address counter 12 and the HV counter 13 generate the grid positions and the coordinates for one stage, the address counter 12 and the HV counter 13 start generating the grid positions and the coordinates of a next stage below. Whereby, the address counter 12 and the HV counter 13 generate the grid positions and the coordinates from the upper stage to the lower stage of the image signal 53.

Figure 6:
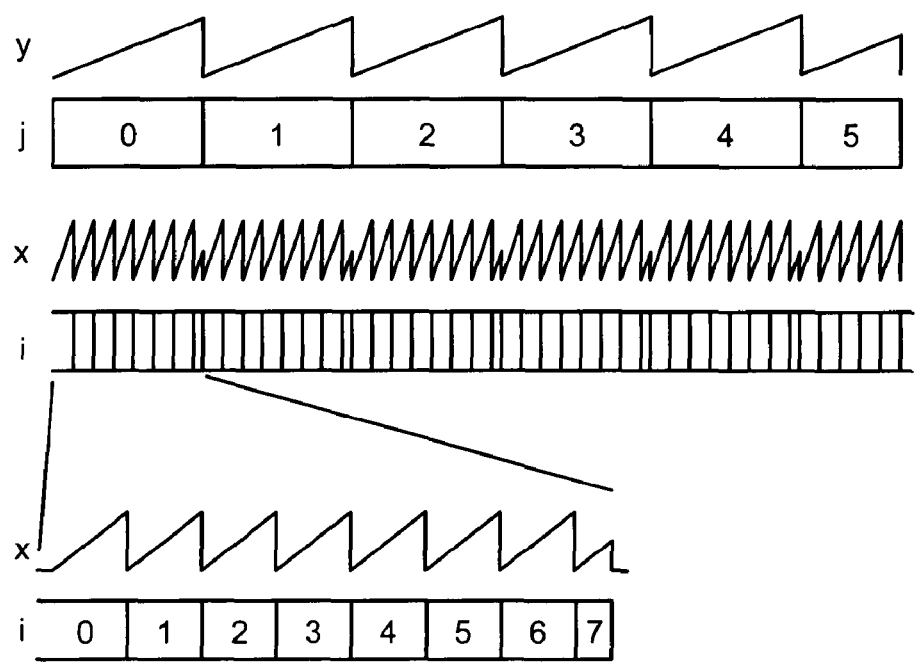
FIG. 6 is a timing chart of an HV counter and an address counter as shown in FIG. 3.

An operation timing (timing of generating a signal) of the address counter 12 and the HV counter 13 is explained below. FIG. 6 is a timing chart of the HV counter 13 and the address counter 12. The address counter 12 generates j=0 as the grid position of a j-th stage. At this time, the address counter 12 generates values of "i" in the order of i=0,1,2,3, . . . as the grid positions of an i-th row. When the address counter 12 generates the last value of "i", the address counter 12 generates j=1 as the grid position of the j-th stage. Then, the address counter 12 generates values of "i" in the order of i=0,1,2,3, . . . as the grid positions of the i-th row. Thereafter, the address counter 12 repeats a process of generating values of "j" in the order of j=2,3,4, . . . as the grid positions of the j-th stage and generating values of "i" in the order of i=0,1,2,3, . . . for each value of "j".

In other words, the grid positions (i,j) of j=0-th stage are sent in the order of (0,0), (1,0), (2,0), (3,0), . . . to the red correction-coefficient register 11R and the blue correction-coefficient register 11B. When all of the grid positions of j=0-th stage are sent to the red correction-coefficient register 11R and the blue correction-coefficient register 11B, the grid positions of j=1-st stage are sent to the red correction-coefficient register 11R and the blue correction-coefficient register 11B. The grid positions (i,j) of j=1-st stage are sent in the order of (0,1), (1,1), (2,1), (3,1), . . . to the red correction-coefficient register 11R and the blue correction-coefficient register 11B. When all of the grid positions of j=1-st stage are sent to the red correction-coefficient register 11R and the blue correction-coefficient register 11B, the grid positions are sent to the red correction-coefficient register 11R and the blue correction-coefficient register 11B in the order of j=2-nd stage and j=3-rd stage.

When the address counter 12 generates the grid positions (i,j), the HV counter 13 generates the coordinates (x,y) in a grid formed by the grid positions (i,j). The HV counter 13 generates y=0 as coordinates (pixel) of a y-th stage. At this time, the HV counter 13 generates values of "x" in the order of x=0,1,2,3, . . . as coordinates of an x-th row. When the HV counter 13 generates the last value of "x", the HV counter 13 generates y=1 as the coordinates of the y-th stage. Then, the HV counter 13 generates values of "x" in the order of x=0,1, 2,3, . . . as the coordinates of the x-th row. Thereafter, the HV counter 13 repeats a process of generating values of "y" in the order of y=2,3,4, . . . as the coordinates of the y-th stage and generating values of "x" in the order of x=0,1,2,3, . . . for each value of "y".

In other words, the coordinates (x,y) of y=0-th stage are sent in the order of (0,0), (1,0), (2,0), (3,0), . . . to the selectors 14a to 14d, the linear interpolation unit 15, and the selector 17. When all of the coordinates of y=0-th stage are sent to the selectors 14a to 14d, the linear interpolation unit 15, and the selector 17, the coordinates of y=1-st stage are sent to the selectors 14a to 14d, and the like. The coordinates (x,y) of y=1-st stage are sent in the order of (0,1), (1,1), (2,1), (3,1), . . . to the selectors 14a to 14d, and the like. When all the coordinates of y=1-st stage are sent to the selectors 14a to 14d, and the like, the coordinates are sent to the selectors 14a to 14d, and the like in the order of y=2-nd stage and 3-rd stage.

Thereafter, the red correction-coefficient register 11R outputs the color shading correction coefficient corresponding to "i" and "j" sent from the address counter 12. Specifically, the red correction-coefficient register 11R outputs Rij, Ri+1j, Rij+1, and Ri+1j+1. Rij, Ri+1j, Rij+1, and Ri+1j+1 from the red correction-coefficient register 11R are sent to the selectors 14a to 14d, respectively.

At this time, the blue correction-coefficient register 11B outputs the color shading correction coefficient corresponding to "i" and "j" sent from the address counter 12. Specifically, the blue correction-coefficient register 11B outputs Bij, Bi+1j, Bij+1, and Bi+1j+1. Bij, Bi+1j, Bij+1, and Bi+1j+1 from the blue correction-coefficient register 11B are sent to the selectors 14a to 14d, respectively.

The selectors 14a to 14d each select any of the color shading correction coefficients from the red correction-coefficient register 11R and the blue correction-coefficient register 11B based on the bayer array 101 as shown in FIG. 2 and the coordinates (x,y). When the lowest bit of "y" is "0", the selectors 14a to 14d each select the color shading correction coefficient from the red correction-coefficient register 11R. When the lowest bit of "y" is "1", the selectors 14a to 14d each select the color shading correction coefficient from the blue correction-coefficient register 11B.

Specifically, when "y" is an even number, the selectors 14a to 14d select Rij, Ri+1j, Rij+1, and Ri+1j+1 as the color shading correction coefficients Vij, Vi+1j, Vij+1, and Vi+1j+1, respectively. When "y" is an odd number, the selectors 14a to 14d select Bij, Bi+1j, Bij+1, and Bi+1j+1 as the color shading correction coefficients Vij, Vi+1j, Vij+1, and Vi+1j+

1, respectively. The selectors 14a to 14d send selected color shading correction coefficients to the linear interpolation unit 15.

The selectors 14a to 14d can select the color shading correction coefficients from the red correction-coefficient register 11R when "x" is an odd number and "y" is an even number. Moreover, the selectors 14a to 14d can select the color shading correction coefficients from the blue correction-coefficient register 11B when "x" is an even number and "y" is an odd number.

The linear interpolation unit 15 generates the color shading correction coefficient corresponding to the coordinates (x,y) by using the color shading correction coefficients sent from the selectors 14a to 14d. If the coordinates (x,y) sent from the HV counter 13 are coordinates at grid points, the linear interpolation unit 15 sets the color shading correction coefficients sent from the selectors 14a to 14d without change.

Specifically, if the coordinates (x,y) sent from the HV counter 13 are the grid point Lij (origin), the linear interpolation unit 15 sets the color shading correction coefficient sent from the selector 14a to the color shading correction coefficient. If the coordinates (x,y) sent from the HV counter 13 are the grid point Li+1j (q,0), the linear interpolation unit 15 sets the color shading correction coefficient sent from the selector 14b to the color shading correction coefficient. If the coordinates (x,y) sent from the HV counter 13 are the grid point Lij+1 (0,p), the linear interpolation unit 15 sets the color shading correction coefficient sent from the selector 14c to the color shading correction coefficient. If the coordinates (x,y) sent from the HV counter 13 are the grid point Li+1j+1 (q,p), the linear interpolation unit 15 sets the color shading correction coefficient sent from the selector 14d to the color shading correction coefficient used for the color shading correction.

Moreover, if the coordinates (x,y) sent from the HV counter 13 are coordinates (coordinates in the grid) other than the grid points, the linear interpolation unit 15 generates the color shading correction coefficient by using the color shading correction coefficients sent from the selectors 14a to 14d. At this time, the linear interpolation unit 15 generates the color shading correction coefficient by using the linear interpolation. Specifically, the linear interpolation unit 15 generates the color shading correction coefficient Axy at the coordinates (x,y) by Equation (1). The linear interpolation unit 15 sends the calculated color shading correction coefficient Axy to the multiplier 16.

Then, the multiplier 16 multiplies the image signal 53 by the color shading correction coefficient Axy generated by the linear interpolation unit 15 and sends the multiplication result to the selector 17. The selector 17 selects any of the multiplication result sent from the multiplier 16 and the image signal 53 based on the coordinates (x,y) and outputs it as the color-shading-corrected image signal 54. When the coordinates (x,y) indicate a position of a green pixel, the selector 17 selects and outputs the image signal 53. When the coordinates (x,y) indicate a position of a blue pixel or a red pixel, the selector 17 selects and outputs the multiplication result sent from the multiplier 16. Specifically, when the lowest bit of "x" is "0", the selector 17 selects the image signal 53, and when the lowest bit of "x" is "1", the selector 17 selects the output from the multiplier 16. Whereby, the selector 17 outputs the color-shading-corrected image signal 54.

In this manner, the color-shading correcting unit 10 arranges the color shading correction coefficients at predetermined intervals on a screen and generates the color shading correction coefficient in an area in which the color shading correction coefficient is not present by the interpolation process based on the color shading correction coefficients near the area, so that the color shading correction coefficients can be stored in a small storage area. Therefore, a storage capacity of the red correction-coefficient register 11R and the blue correction-coefficient register 11B can be reduced compared with the case of storing all color shading correction coefficients. Moreover, the color shading correction coefficients can be set with high degree of freedom compared with the case of giving the color shading correction coefficients by the function approximation. Thus, the color shading correction can be performed with high accuracy.

In the present embodiment, explanation is given for the case in which the image signal has the bayer array, the image signal can be an RGB signal or a YUV signal by performing demosaicking or the like on the image signal. Moreover, in the present embodiment, a register such as the red correction-coefficient register 11R and the blue correction-coefficient register 11B is used; however, a memory can be used instead of the register.

Furthermore, in the present embodiment, explanation is given for the case in which the linear interpolation unit 15 generates the color shading correction coefficients by the linear interpolation; however, the linear interpolation unit 15 can generate the color shading correction coefficients by a high-order interpolation algorithm. Moreover, in the present embodiment, explanation is given for the case in which one color is allocated to each pixel; however, three colors can be allocated to each pixel. In this case, the image signal 53 has three components of RGB.

According to the first embodiment, because the color shading correction coefficient for each grid point is stored in the red correction-coefficient register 11R or the blue correction-coefficient register 11B, it is possible to select and set a distribution profile of the color shading correction coefficients freely. Therefore, the color shading correction can be performed flexibly with respect to the color distribution due to color shading. Moreover, because the linear interpolation unit 15 generates the color shading correction coefficients by the linear interpolation, the storage capacity of the red correction-coefficient register 11R and the blue correction-coefficient register 11B can be reduced. Furthermore, because the color shading correction coefficients are generated by the linear interpolation, the color shading correction coefficients can be easily generated.

Moreover, the color shading correction coefficient for green needs not be stored so long as the color shading correction coefficients for red and blue with respect to green are stored, so that the color shading correction coefficients can be stored with a small circuit. Thus, efficient color shading correction can be accurately performed with a simple configuration.

Next, a second embodiment is explained with reference to FIGS. 7 and 8. In the second embodiment, the color shading correction coefficients are generated by an arithmetic process and the image signal 53 is subjected to the color shading correction by using the generated color shading correction coefficients. Therefore, a difference from the color shading correction coefficient on an adjacent grid point on the left side of each grid point is stored instead of the color shading correction coefficients. The color shading correction coefficient of the leftmost-end grid point is stored without taking a difference.

Figure 7:
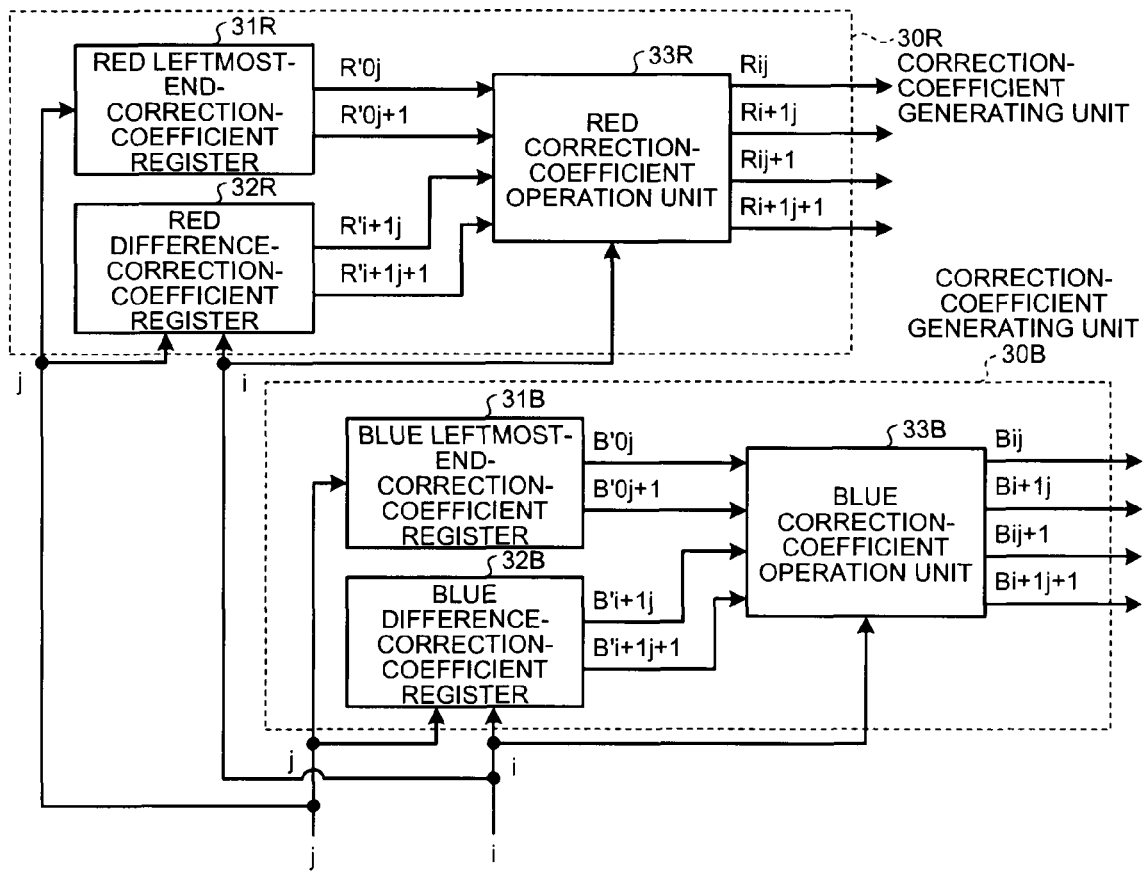
FIG. 7 is a block diagram of a configuration of correction-coefficient generating units of a shading correcting device according to a second embodiment of the present invention.

FIG. 7 is a block diagram of a configuration of correction-coefficient generating units 30R and 30B of the color-shading correcting unit 10 according to the second embodiment of the present invention. The color-shading correcting unit 10 according to the second embodiment includes the correction-coefficient generating units 30R and 30B instead of the red correction-coefficient register 11R and the blue correction-coefficient register 11B in the first embodiment.

The correction-coefficient generating unit 30R includes a red leftmost-end-correction-coefficient register 31R, a red difference-correction-coefficient register 32R, and a red correction-coefficient operation unit 33R. The correction-coefficient generating unit 30B includes a blue leftmost-end-correction-coefficient register 31B, a blue difference-correction-coefficient register 32B, and a blue correction-coefficient operation unit 33B.

The red leftmost-end-correction-coefficient register 31R is a register that stores therein the color shading correction coefficients at the leftmost end (i=0) in a pixel area among the color shading correction coefficients used for red pixels. The red leftmost-end-correction-coefficient register 31R inputs "j" sent from the address counter 12 and outputs the color shading correction coefficient corresponding to "j". Specifically, the red leftmost-end-correction-coefficient register 31R outputs R'0j and R'0j+1 as the color shading correction coefficients corresponding to i=0 and each "j". R'0j and R'0j+1 are the color shading correction coefficients set on the grid points L0j and L0j+1, respectively. R'0j and R'0j+1 from the red leftmost-end-correction-coefficient register 31R are sent to the red correction-coefficient operation unit 33R.

The red difference-correction-coefficient register 32R is a register that stores therein a difference between the color shading correction coefficient for red set on each grid point and the color shading correction coefficient for red set on the adjacent grid point (grid point on the left side) as a difference correction coefficient for red. The red difference-correction-coefficient register 32R stores therein the difference correction coefficients for red set on the grid points other than the leftmost end (i≠0) in the pixel area. The red difference-correction-coefficient register 32R inputs "i" and "j" sent from the address counter 12 and outputs the difference correction coefficient for red corresponding to "i" and "j". Specifically, the red difference-correction-coefficient register 32R outputs R'i+1j and R'i+1j+1 as the difference correction coefficients for red corresponding to "i" and "j". R'i+1j and R'i+1j+1 are the difference correction coefficients for red set on the grid points Li+1j and Li+1j+1, respectively. R'i+1j and R'i+1j+1 from the red difference-correction-coefficient register 32R are sent to the red correction-coefficient operation unit 33R.

The red correction-coefficient operation unit 33R calculates the color shading correction coefficient set on each grid point by using the leftmost-end color shading correction coefficients stored in the red leftmost-end-correction-coefficient register 31R and the difference correction coefficients for red stored in the red difference-correction-coefficient register 32R. The red correction-coefficient operation unit 33R outputs the leftmost-end color shading correction coefficient stored in the red leftmost-end-correction-coefficient register 31R as the color shading correction coefficient set on the grid point of i=0. Moreover, when the red correction-coefficient operation unit 33R calculates the color shading correction coefficient set on the grid point of i=1, the red correction-coefficient operation unit 33R adds the difference correction coefficient for red corresponding to i=1 to the leftmost-end color shading correction coefficient and outputs it. Whereby, the red correction-coefficient operation unit 33R outputs Rij, Ri+1j, Rij+1, and Ri+1j+1 in the similar manner to the red correction-coefficient register 11R in the first embodiment.

The blue leftmost-end-correction-coefficient register 31B, the blue difference-correction-coefficient register 32B, and the blue correction-coefficient operation unit 33B have the same configurations as the red leftmost-end-correction-coefficient register 31R, the red difference-correction-coefficient register 32R, and the red correction-coefficient operation unit 33R, respectively.

That is, the blue leftmost-end-correction-coefficient register 31B is a register that stores therein the color shading correction coefficients at the leftmost end (i=0) in the pixel area among the color shading correction coefficients used for blue pixels. The blue leftmost-end-correction-coefficient register 31B inputs "j" sent from the address counter 12 and outputs the color shading correction coefficient corresponding to "j". Specifically, the blue leftmost-end-correction-coefficient register 31B outputs B'0j and B'0j+1 as the color shading correction coefficients corresponding to i=0 and each "j". B'0j and B'0j+1 are the color shading correction coefficients set on the grid points L0j and L0j+1, respectively. B'0j and B'0j+1 from the blue leftmost-end-correction-coefficient register 31B are sent to the blue correction-coefficient operation unit 33B.

The blue difference-correction-coefficient register 32B is a register that stores therein a difference between the color shading correction coefficient for blue set on each grid point and the color shading correction coefficient for blue set on the adjacent grid point (grid point on the left side) as a difference correction coefficient for blue. The blue difference-correction-coefficient register 32B stores therein the difference correction coefficients for blue set on the grid points other than the leftmost end (i≠0) in the pixel area. The blue difference-correction-coefficient register 32B inputs "i" and "j" sent from the address counter 12 and outputs the difference correction coefficient for blue corresponding to "i" and "j". Specifically, the blue difference-correction-coefficient register 32B outputs B'i+1j and B'i+1j+1 as the difference correction coefficients for blue corresponding to "i" and "j". B'i+1j and B'i+1j+1 are the difference correction coefficients for blue set on the grid points Li+1j and Li+1j+1, respectively. B'i+1j and B'i+1j+1 from the blue difference-correction-coefficient register 32B are sent to the blue correction-coefficient operation unit 33B.

The blue correction-coefficient operation unit 33B calculates the color shading correction coefficient set on each grid point by using the leftmost-end color shading correction coefficients stored in the blue leftmost-end-correction-coefficient register 31B and the difference correction coefficients for blue stored in the blue difference-correction-coefficient register 32B. The blue correction-coefficient operation unit 33B outputs the leftmost-end color shading correction coefficient stored in the blue leftmost-end-correction-coefficient register 31B as the color shading correction coefficient set on the grid point of i=0. Moreover, when the blue correction-coefficient operation unit 33B calculates the color shading correction coefficient set on the grid point of i=1, the blue correction-coefficient operation unit 33B adds the difference correction coefficient for blue corresponding to i=1 to the leftmost-end color shading correction coefficient and outputs it. Whereby, the blue correction-coefficient operation unit 33B outputs Bij, Bi+1j, Bij+1, and Bi+1j+1 in the similar manner to the blue correction-coefficient register 11B in the first embodiment.

Next, operation procedures of the correction-coefficient generating units 30R and 30B are explained. The correction-coefficient generating units 30R and 30B operate in the similar manner, so that only the operation procedure of the correction-coefficient generating unit 30R is explained.

Figure 8:
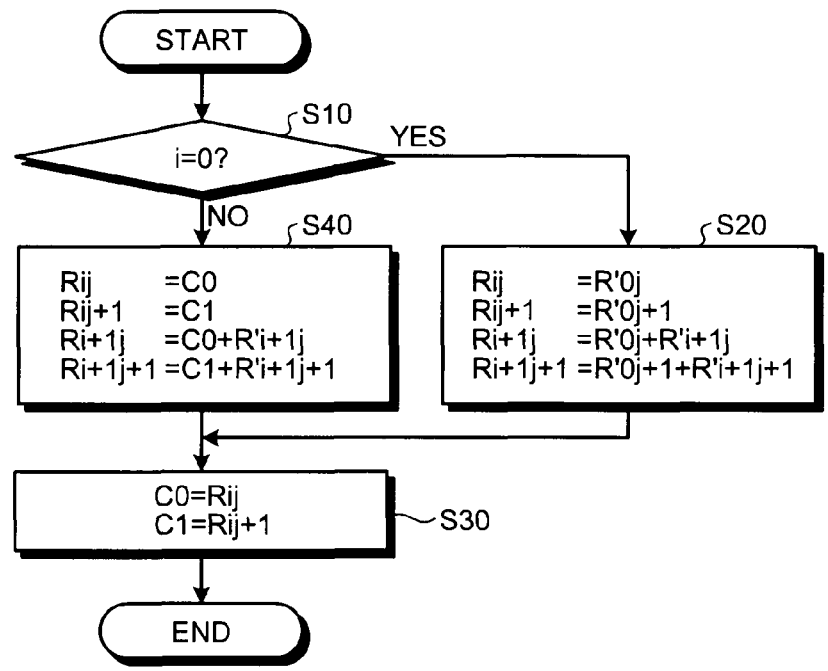
FIG. 8 is a flowchart of an operation of the correction-coefficient generating unit as shown in FIG. 7.

FIG. 8 is a flowchart of the operation of the correction-coefficient generating unit 30R. When "j" sent from the address counter 12 is input to the red leftmost-end-correction-coefficient register 31R, the red leftmost-end-correction-coefficient register 31R sends the color shading correction coefficient corresponding to "j" to the red correction-coefficient operation unit 33R. Specifically, the red leftmost-end-correction-coefficient register 31R outputs R'0j and R'0j+1 as the color shading correction coefficients.

When "i" and "j" sent from the address counter 12 are input to the red difference-correction-coefficient register 32R, the red difference-correction-coefficient register 32R sends the color shading correction coefficient for red corresponding to "i" and "j" to the red correction-coefficient operation unit 33R. When i=0 ("i" is sent from the address counter 12) (Yes at Step S10), the red difference-correction-coefficient register 32R outputs R'i+1j and R'i+1j+1 as the difference correction coefficients for red corresponding to i=1 without outputting the difference correction coefficients for red corresponding to i=0.

The red correction-coefficient operation unit 33R outputs the leftmost-end color shading correction coefficient stored in the red leftmost-end-correction-coefficient register 31R as the color shading correction coefficient when i=0 and the color shading correction coefficient that is obtained by adding the difference correction coefficient for red when i=1 to the leftmost-end color shading correction coefficient. Whereby, when i=0, the red correction-coefficient operation unit 33R outputs the color shading correction coefficients set on the grid points L0j, L0j+1, L1j, and L1j+1. Specifically, the red correction-coefficient operation unit 33R outputs Rij=R'0j, Rij+1=R'0j+1, Ri+1j=(R'0j)+(R'i+1j), and Ri+1j+1=(R'0j+1)+(R'i+1j+1) (Step S20).

Thereafter, the red correction-coefficient operation unit 33R sets C0=Rij and C1=Rij+1 as the color shading correction coefficients on the adjacent gird points on the left side (Step S30). Rij and Rij+1 are the color shading correction coefficients when i=1. Next, when "i" and "j" sent from the address counter 12 are input to the red difference-correction-coefficient register 32R, the red difference-correction-coefficient register 32R sends the difference correction coefficient for red corresponding to "i" and "j" to the red correction-coefficient operation unit 33R. When i≠0 ("i" is sent from the address counter 12) (No at Step S10), the red difference-correction-coefficient register 32R outputs the difference correction coefficient for red corresponding to i+1.

The red correction-coefficient operation unit 33R outputs the color shading correction coefficient on the adjacent grid point on the left side and the color shading correction coefficient that is obtained by adding the difference correction coefficient for red of i+1 to the above color shading correction coefficient. In other words, the red correction-coefficient operation unit 33R restores the color shading correction coefficient stored in the form of the difference by calculating the sum of the color shading correction coefficient of the adjacent grid point and the difference correction coefficients for red and outputs it. Whereby, the red correction-coefficient operation unit 33R outputs the color shading correction coefficients set on the grid points Lij, Li+1j, Lij+1, and Li+1j+1. Specifically, the red correction-coefficient operation unit 33R outputs Rij=C0, Rij+1=C1, Ri+1j=C0+(R'i+1j), and Ri+1j+1=C1+(R'i+1j+1) (Step S40).

Then, the red correction-coefficient operation unit 33R sets new C0=Rij and C1=Rij+1 as the color shading correction coefficients of the adjacent grid points on the left side (Step S30). Rij and Rij+1 are the color shading correction coefficients when i+1.

Thereafter, the red correction-coefficient operation unit 33R repeats the processes at Steps S40 and S30. When the red correction-coefficient operation unit 33R outputs the color shading correction coefficient corresponding to the last value of "i", the correction-coefficient generating unit 30R starts repeating the processes from Step S10 to Step S40 for the next value of "j".

In the present embodiment, the difference from the color shading correction coefficient of the adjacent grid point on the left side is stored as the color shading correction coefficient for red; however, the difference from any of the color shading correction coefficients of the adjacent grid point on the upper, lower, and right sides can be stored.

According to the second embodiment, when grid points are adjacent to each other, a correlation exists between the color shading correction coefficients, so that an amount of data to be stored can be reduced by storing the differences of the color shading correction coefficient between adjacent grid points. Thus, the number of bits of data stored as information used for the color shading correction can be reduced, enabling to perform the color shading correction with a small circuit.

Next, a third embodiment is explained with reference to FIG. 9. Color shading of the image signal 53 changes depending on a color temperature. Therefore, in the third embodiment, the color shading correction coefficient is changed in proportional to the color temperature for improving the accuracy in color shading correction.

Figure 9:
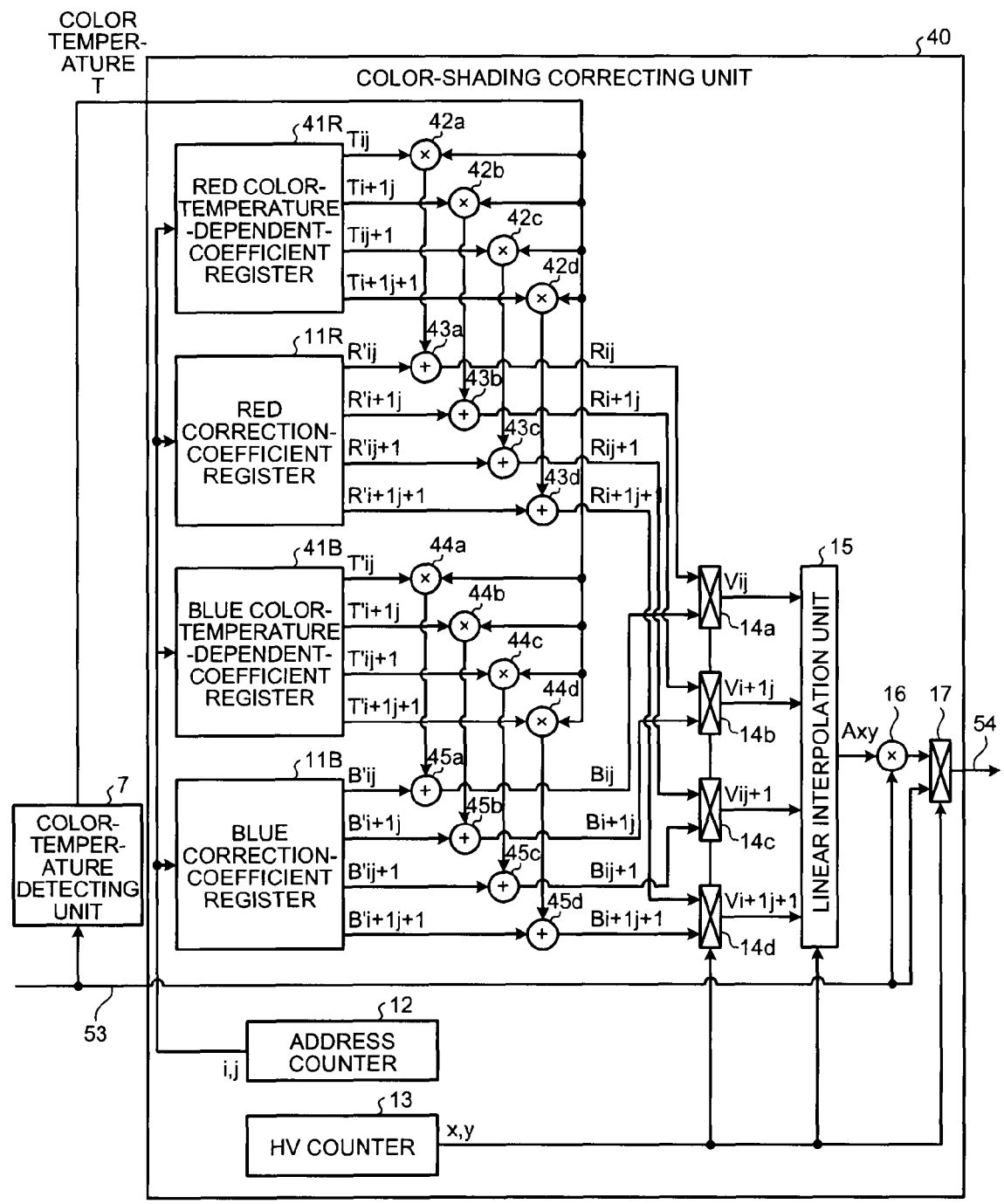
FIG. 9 is a block diagram of a configuration of a color-shading correcting unit according to a third embodiment of the present invention.

FIG. 9 is a block diagram of a configuration of a color-shading correcting unit 40 according to the third embodiment of the present invention. In FIG. 9, components that have the same function as those of the color-shading correcting unit 10 in the first embodiment as shown in FIG. 3 will be given the same reference numerals and explanation thereof is omitted.

The color-shading correcting unit 40 includes a red color-temperature-dependent-coefficient register 41R, a blue color-temperature-dependent-coefficient register 41B, multipliers 42a to 42d and 44a to 44d, and adders 43a to 43d and 45a to 45d, in addition to the red correction-coefficient register 11R, the blue correction-coefficient register 11B, the address counter 12, the HV counter 13, the linear interpolation unit 15, the multiplier 16, and the selector 17.

The color-shading correcting unit 10 in the present embodiment includes a color-temperature detecting unit 7 in addition to the components as shown in FIG. 1. The color-temperature detecting unit 7 is connected to the A/D converting unit 4 and the color-shading correcting unit 40. The color-temperature detecting unit 7 inputs the image signal 53 sent from the A/D converting unit 4, detects a color temperature T corresponding to the image signal 53, and outputs the color temperature T to the color-shading correcting unit 40.

The address counter 12 in the present embodiment sends "i" and "j" indicating a position of the grid point Lij to the red color-temperature-dependent-coefficient register 41R, the blue color-temperature-dependent-coefficient register 41B, the red correction-coefficient register 11R, and the blue correction-coefficient register 11B.

The red color-temperature-dependent-coefficient register 41R is a register that stores therein the color temperature dependent coefficients (for red) for changing the color shading correction coefficients for red in accordance with the color temperature T. The red color-temperature-dependent-coefficient register 41R inputs "i" and "j" sent from the address counter 12 and outputs the color temperature dependent coefficient corresponding to "i" and "j". Specifically, the red color-temperature-dependent-coefficient register 41R outputs Tij, Ti+1j, Tij+1, and Ti+1j+1 as the color temperature dependent coefficients corresponding to "i" and "j". Tij, Ti+1j, Tij+1, and Ti+1j+1 are the color temperature dependent coefficients set on the grid points Lij, Li+1j, Lij+1, and Li+1j+1, respectively. Tij, Ti+1j, Tij+1, and Ti+1j+1 from the red color-temperature-dependent-coefficient register 41R are sent to the multipliers 42a to 42d, respectively.

The multiplier 42a multiplies Tij from the red color-temperature-dependent-coefficient register 41R by the color temperature T sent from the color-temperature detecting unit 7 and sends the multiplication result to the adder 43a. In the similar manner, the multipliers 42b, 42c, and 42d multiply Ti+1j, Tij+1, and Ti+1j+1 from the red color-temperature-dependent-coefficient register 41R by the color temperature T sent from the color-temperature detecting unit 7 and sends the multiplication results to the adders 43b, 43c, and 43d, respectively.

The adder 43a adds R'ij from the red correction-coefficient register 11R to the multiplication result from the multiplier 42a and sends the addition result to the selector 14a. In the similar manner, the adders 43b, 43c, and 43d add R'i+1j, R'ij+1, and R'i+1j+1 from the red correction-coefficient register 11R to the multiplication results from the multipliers 42b, 42c, and 42d and sends the addition results to the selectors 14b, 14c, and 14d, respectively.

The blue color-temperature-dependent-coefficient register 41B is a register that stores therein the color temperature dependent coefficients (for blue) for changing the color shading correction coefficients for blue in accordance with the color temperature T. The blue color-temperature-dependent-coefficient register 41B inputs "i" and "j" sent from the address counter 12 and outputs the color temperature dependent coefficient corresponding to "i" and "j". Specifically, the blue color-temperature-dependent-coefficient register 41B outputs T'ij, T'i+1j, T'ij+1, and T'i+1j+1 as the color temperature dependent coefficients corresponding to "i" and "j". T'ij, T'i+1j, T'ij+1, and T'i+1j+1 are the color temperature dependent coefficients set on the grid points Lij, Li+1j, Lij+1, and Li+1j+1, respectively. T'ij, T'i+1j, T'ij+1, and T'i+1j+1 from the blue color-temperature-dependent-coefficient register 41B are sent to the multipliers 44a to 44d, respectively.

The multiplier 44a multiplies T'ij from the blue color-temperature-dependent-coefficient register 41B by a color temperature T' sent from the color-temperature detecting unit 7 and sends the multiplication result to the adder 45a. In the similar manner, the multipliers 44b, 44c, and 44d multiply T'i+1j, T'ij+1, and T'i+1j+1 from the blue color-temperature-dependent-coefficient register 41B by the color temperature T' sent from the color-temperature detecting unit 7 and sends the multiplication results to the adders 45b, 45c, and 45d, respectively.

The adder 45a adds B'ij from the blue correction-coefficient register 11B to the multiplication result from the multiplier 44a and sends the addition result to the selector 14a. In the similar manner, the adders 45b, 45c, and 45d add B'i+1j, B'ij+1, and B'i+1j+1 from the blue correction-coefficient register 11B to the multiplication result from the multipliers 44b, 44c, and 44d and sends the addition results to the selectors 14b, 14c, and 14d, respectively.

In the present embodiment, the multipliers 42a to 42d respectively multiply Tij, Ti+1j, Tij+1, and Ti+1j+1 by the color temperature T, and the adders 43a to 43d add R'ij, R'i+1j, R'ij+1, and R'i+1j+1 to the multiplication results, respectively. Then, the adders 43a to 43d input the addition results to the selectors 14a to 14d as the color shading correction coefficients (Rij, Ri+1j, Rij+1, and Ri+1j+1) on the grid points Lij, Li+1j, Lij+1, and Li+1j+1, respectively. In other words, in the present embodiment, the color shading correction coefficient Rij for red on the grid point Lij is defined by Equation (2).

$$Rij = T \times Tij + R'ij \quad (2)$$

Moreover, in the present embodiment, the multipliers 44a to 44d multiply T'ij, T'i+1j, T'ij+1, and T'i+1j+1 by the color temperature T', respectively, and the adders 45a to 45d add B'ij, B'i+1j, B'ij+1, and B'i+1j+1 to the multiplication results, respectively. Then, the adders 45a to 45d input the addition results to the selectors 14a to 14d as the color shading correction coefficients (Bij, Bi+1j, Bij+1, and Bi+1j+1) on the grid points Lij, Li+1j, Lij+1, and Li+1j+1, respectively. In other words, in the present embodiment, the color shading correction coefficient Bij for blue on the grid point Lij is defined by Equation (3).

$$Bij = T \times T'ij + B'ij \quad (3)$$

In the present embodiment, explanation is given for the case of applying a method of changing the color shading correction coefficient in accordance with the color temperature to the color shading correction in the first embodiment; however, the color shading correction in the present embodiment can be applied to the color shading correction in the second embodiment.

Moreover, in the present embodiment, explanation is given for the case of approximating the color temperature dependency of the color shading correction coefficient by a primary expression; however the color temperature dependency of the color shading correction coefficient can be approximated by a quadratic or higher order expression.

According to the third embodiment, because the color shading correction coefficient is changed in accordance with the color temperature, color shading that changes in accordance with the color temperature can be accurately corrected with a simple configuration. Thus, the color shading correction responding to the change in color temperature can be performed.

Next, a fourth embodiment is explained with reference to FIG. 10. In the fourth embodiment, the color shading correction is performed by an interpolation unit 18 and a central processing unit (CPU) 8 instead of the linear interpolation unit 15.

Figure 10:
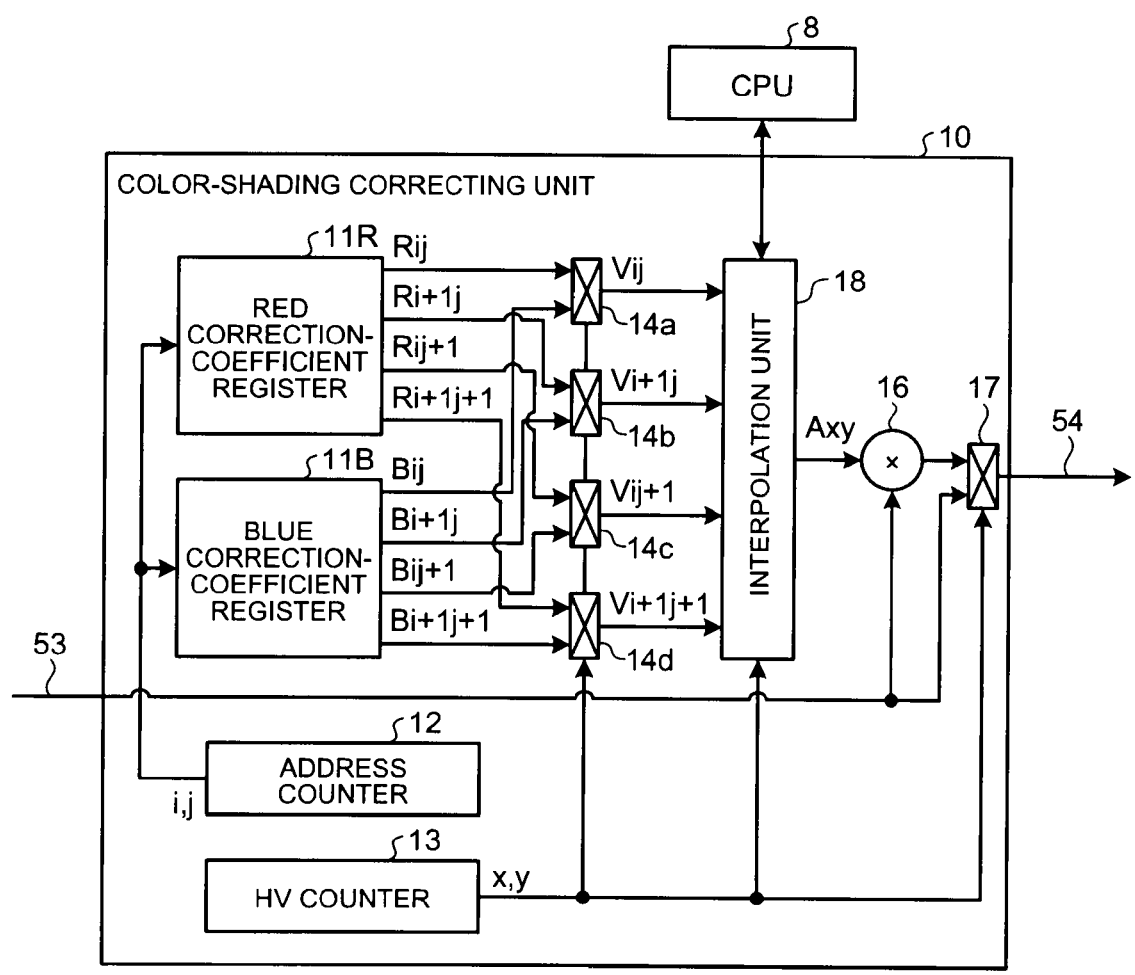
FIG. 10 is a block diagram of a configuration of a color-shading correcting unit according to a fourth embodiment of the present invention.

FIG. 10 is a block diagram of a configuration of the color-shading correcting unit 10 according to the fourth embodiment of the present invention. In FIG. 10, components that have the same function as those of the color-shading correcting unit 10 in the first embodiment as shown in FIG. 3 will be given the same reference numerals and explanation thereof is omitted.

The color-shading correcting unit 10 in the present embodiment includes the interpolation unit 18 in addition to the red correction-coefficient register 11R, the blue correction-coefficient register 11B, the address counter 12, the HV counter 13, the selectors 14a to 14d and 17, and the multiplier 16.

Moreover, the color-shading correcting unit 10 in the present embodiment includes the CPU 8 in addition to the components as shown in FIG. 3. The CPU 8 executes an interpolation calculation of the color shading correction coefficients with software that executes a high-order interpolation algorithm. Specifically, the CPU 8 executes the interpolation calculation of the color shading correction coefficients with an interpolation calculation program that is a computer program for executing the interpolation calculation of the color shading correction coefficients. The CPU 8 is arranged outside the color-shading correcting unit 10 and is connected to the interpolation unit 18. The CPU 8 receives the color shading correction coefficients on the grid points from the interpolation unit 18 and sends a result of the interpolation calculation of the color shading correction coefficients to the interpolation unit 18.

Next, an operation procedure of the color-shading correcting unit 10 is explained, in which the process of the operation similar to that explained in the first embodiment is not explained.

The selectors 14a to 14d send the color shading correction coefficients Vij, Vi+1j, Vij+1, and Vi+1j+1, respectively, to the interpolation unit 18. The interpolation unit 18 sends the color shading correction coefficients Vij, Vi+1j, Vij+1, and Vi+1j+1 from the selectors 14a to 14d and the coordinates (x,y) from the HV counter 13 to the CPU 8. The CPU 8 executes the interpolation calculation of the color shading correction coefficients in the grid by a high-order interpolation algorithm. The high-order interpolation algorithm includes a spline function and a bicubic interpolation. At this time, the CPU 8 calculates the color shading correction coefficient corresponding to the coordinates (x,y) using the color shading correction coefficients sent from the selectors 14a to 14d. Then, the CPU 8 sends the calculated color shading correction coefficient to the interpolation unit 18. Thereafter, the interpolation unit 18 sends the color shading correction coefficient Axy to the multiplier 16.

In the present embodiment, explanation is given for the case of applying the color shading correction using the CPU 8 and the interpolation unit 18 to the color shading correction in the first embodiment; however, the color shading correction in the present embodiment can be applied to the color shading correction in the second or third embodiment.

Moreover, in the present embodiment, explanation is given for the case in which the CPU 8 executes the interpolation calculation of the color shading correction coefficients in the grid by a high-order interpolation algorithm; however, the CPU 8 can execute the interpolation calculation of the color shading correction coefficients in the grid by a linear interpolation algorithm.

According to the fourth embodiment, because the interpolation process method can be selected by software, the interpolation method for the color shading correction coefficients can be arbitrary selected, enabling to perform efficient color shading correction accurately with a simple configuration. Moreover, because the color shading correction is performed by a high-order interpolation algorithm, the color shading correction with higher accuracy than a linear interpolation can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shading correcting device comprising:
   a correction-coefficient output unit that outputs a correction coefficient for performing a color shading correction on an image signal, which is set on a predetermined position on an image area displayed on a screen and corresponds to each position, as a color shading correction coefficient for each position; and
   a correction-coefficient interpolation unit that calculates a color shading correction coefficient used for the color shading correction at a position of a pixel at which the color shading correction coefficient is not set among pixels in the image signal by an interpolation process using the color shading correction coefficient from the correction-coefficient output unit, wherein
   the color shading correction coefficient output from the correction-coefficient output unit is a color shading correction coefficient that is for a first color as a target for the color shading correction and a ratio between a coloration state of the first color and a coloration state of a second color, which is adjacent to a pixel of the first color, as a non-target for the color shading correction,
   when an image signal of the first color is output, the correction-coefficient interpolation unit outputs the image signal of the first color by performing the color shading correction on the image signal of the first color based on the color shading correction coefficient calculated by the interpolation process and a pixel value of the second color, and
   when an image signal for the second color is output, the correction-coefficient output unit outputs the image signal of the second color without performing the color shading correction on the second color.

2. The shading correcting device according to claim 1, wherein
   positions of pixels at which color shading correction coefficients are set are arranged in a grid manner, and
   the correction-coefficient interpolation unit calculates the color shading correction coefficient by using four color shading correction coefficients set on four grid points surrounding a position of the pixel corresponding to the image signal of the first color.

3. The shading correcting device according to claim 1, wherein
   the correction-coefficient output unit includes a first correction-coefficient storing unit that stores therein the color shading correction coefficient for each grid point, and
   the correction-coefficient output unit outputs the color shading correction coefficient stored in the first correction-coefficient storing unit.

4. The shading correcting device according to claim 1, wherein
   the correction-coefficient output unit includes
      a first counter that specifies a position of a grid point of a color shading correction coefficient to be output, and
      a second counter that specifies a position of a pixel corresponding to the image signal of the first color as a position in a grid constituted by grid points specified by the first counter, and
   the correction-coefficient interpolation unit calculates a color shading correction coefficient corresponding to the position specified by the second counter by the interpolation process using the color shading correction coefficient at the grid point specified by the first counter.

5. The shading correcting device according to claim 1, wherein
   the correction-coefficient output unit includes
      a correction-coefficient storing unit that stores therein at least one color shading correction coefficient as the color shading correction coefficient,
      a difference storing unit that stores therein a difference between a color shading correction coefficient set at each position and a color shading correction coefficient set at a position adjacent to the each position as a difference correction coefficient, and
      a correction-coefficient calculating unit that calculates a color shading correction coefficient at each position on the image area by using the color shading correction coefficient stored in the correction-coefficient storing unit and the difference correction coefficient stored in the difference storing unit, and the correction-coefficient output unit outputs the color shading correction coefficient calculated by the correction-coefficient calculating unit.

6. The shading correcting device according to claim 1, wherein the correction-coefficient output unit includes a correcting unit that corrects a color shading correction coefficient to be output to a value in accordance with a color temperature detected from the image signal.

7. The shading correcting device according to claim 1, wherein the correction-coefficient interpolation unit calculates the color shading correction coefficient by a linear interpolation process.

8. The shading correcting device according to claim 1, wherein the correction-coefficient interpolation unit calculates the color shading correction coefficient by a high-order interpolation algorithm.

9. The shading correcting device according to claim 1, wherein
an external central processing unit calculates the color shading correction coefficient used for the color shading correction at the position of the pixel at which the color shading correction coefficient is not set among the pixels in the image signal by a high-order interpolation algorithm that uses the color shading correction coefficient from the correction-coefficient output unit, and
the correction-coefficient interpolation unit performs the color shading correction on the first color by using the color shading correction coefficient calculated by the external central processing unit.

10. An imaging apparatus comprising:
an image-signal generating unit that generates an image signal by focusing light from an imaging target;
a color-shading correcting unit that performs a color shading correction on the image signal; and
a luminance-shading correcting unit that performs a luminance shading correction on the image signal that is subjected to the color shading correction, wherein
the color-shading correcting unit includes
a correction-coefficient output unit that outputs a correction coefficient for performing a color shading correction on the image signal, which is set on a predetermined position on an image area displayed on a screen and corresponds to each position, as a color shading correction coefficient for each position; and
a correction-coefficient interpolation unit that calculates a color shading correction coefficient used for the color shading correction at a position of a pixel at which the color shading correction coefficient is not set among pixels in the image signal by an interpolation process using the color shading correction coefficient from the correction-coefficient output unit,
the color shading correction coefficient output from the correction-coefficient output unit is a color shading correction coefficient that is for a first color as a target for the color shading correction and a ratio between a coloration state of the first color and a coloration state of a second color, which is adjacent to a pixel of the first color, as a non-target for the color shading correction,
when an image signal of the first color is output, the correction-coefficient interpolation unit outputs the image signal of the first color by performing the color shading correction on the image signal of the first color based on the color shading correction coefficient calculated by the interpolation process and a pixel value of the second color, and
when an image signal for the second color is output, the correction-coefficient output unit outputs the image signal of the second color without performing the color shading correction on the second color.

11. The imaging apparatus according to claim 10, wherein positions of pixels at which color shading correction coefficients are set are arranged in a grid manner, and
the correction-coefficient interpolation unit calculates the color shading correction coefficient by using four color shading correction coefficients set on four grid points surrounding a position of the pixel corresponding to the image signal of the first color.

12. The imaging apparatus according to claim 10, wherein
the correction-coefficient output unit includes a first correction-coefficient storing unit that stores therein the color shading correction coefficient for each grid point, and
the correction-coefficient output unit outputs the color shading correction coefficient stored in the first correction-coefficient storing unit.

13. The imaging apparatus according to claim 10, wherein the correction-coefficient output unit includes
a first counter that specifies a position of a grid point of a color shading correction coefficient to be output, and
a second counter that specifies a position of a pixel corresponding to the image signal of the first color as a position in a grid constituted by grid points specified by the first counter, and
the correction-coefficient interpolation unit calculates a color shading correction coefficient corresponding to the position specified by the second counter by the interpolation process using the color shading correction coefficient at the grid point specified by the first counter.

14. The imaging apparatus according to claim 10, wherein the correction-coefficient output unit includes
a correction-coefficient storing unit that stores therein at least one color shading correction coefficient as the color shading correction coefficient,
a difference storing unit that stores therein a difference between a color shading correction coefficient set at each position and a color shading correction coefficient set at a position adjacent to the each position as a difference correction coefficient, and
a correction-coefficient calculating unit that calculates a color shading correction coefficient at each position on the image area by using the color shading correction coefficient stored in the correction-coefficient storing unit and the difference correction coefficient stored in the difference storing unit, and
the correction-coefficient output unit outputs the color shading correction coefficient calculated by the correction-coefficient calculating unit.

15. The imaging apparatus according to claim 10, wherein the correction-coefficient output unit includes a correcting unit that corrects a color shading correction coefficient to be output to a value in accordance with a color temperature detected from the image signal.

16. The imaging apparatus according to claim 10, wherein the correction-coefficient interpolation unit calculates the color shading correction coefficient by a linear interpolation process.

17. The imaging apparatus according to claim 10, wherein the correction-coefficient interpolation unit calculates the color shading correction coefficient by a high-order interpolation algorithm.

18. The imaging apparatus according to claim 10, wherein an external central processing unit calculates the color shading correction coefficient used for the color shading correction at the position of the pixel at which the color shading correction coefficient is not set among the pixels in the image signal by a high-order interpolation algorithm that uses the color shading correction coefficient from the correction-coefficient output unit, and the correction-coefficient interpolation unit performs the color shading correction on the first color by using the color shading correction coefficient calculated by the external central processing unit.

* * * * *